United States Patent [19]

Hayashibe

[11] 4,441,151
[45] Apr. 3, 1984

[54] APPARATUS FOR TUNING PID CONTROLLERS IN PROCESS CONTROL SYSTEMS

[75] Inventor: Shuji Hayashibe, Tokyo, Japan

[73] Assignee: Toyo Systems, Ltd., Tokyo, Japan

[21] Appl. No.: 515,801

[22] Filed: Aug. 29, 1983

Related U.S. Application Data

[63] Continuation of Ser. No. 198,185, Oct. 17, 1980, which is a continuation-in-part of Ser. No. 115,197, Jan. 25, 1980, abandoned.

[30] Foreign Application Priority Data

Nov. 4, 1977 [JP] Japan ............................. 52-131511

[51] Int. Cl.³ .............................................. G05B 13/02
[52] U.S. Cl. ..................................... 364/157; 318/561; 364/159; 364/162; 364/553
[58] Field of Search ................................ 364/148-151, 364/157-159, 160-163, 553; 318/561, 609, 610, 621

[56] References Cited

U.S. PATENT DOCUMENTS

| 3,109,970 | 11/1963 | Smyth | 318/561 |
| 3,149,270 | 9/1964 | Smyth et al. | 318/561 |
| 3,177,347 | 4/1965 | Cowley | 364/553 |
| 3,536,978 | 10/1970 | Meredith et al. | 318/561 |
| 3,781,626 | 12/1973 | Kubo et al. | 318/561 |
| 3,862,403 | 1/1975 | Kurihara | 364/159 |
| 4,096,425 | 6/1978 | Brown et al. | 318/561 |

Primary Examiner—Joseph F. Ruggiero
Attorney, Agent, or Firm—Bruce L. Birchard

[57] ABSTRACT

By applying to a linear, time-invariant process or system a pulse of predetermined duration instead of a step function and measuring the area enclosed by the pulse and the response curve of the process, respectively, instead of measuring the slope of a tangent line to the point of inflection of the response curve, the time constant or constants of a closed-loop (self-balancing) or open-loop (non-self-balancing) process may be accurately determined and from such time constant or constants the process may be optimally tuned according to one of the accepted tuning methods.

5 Claims, 17 Drawing Figures

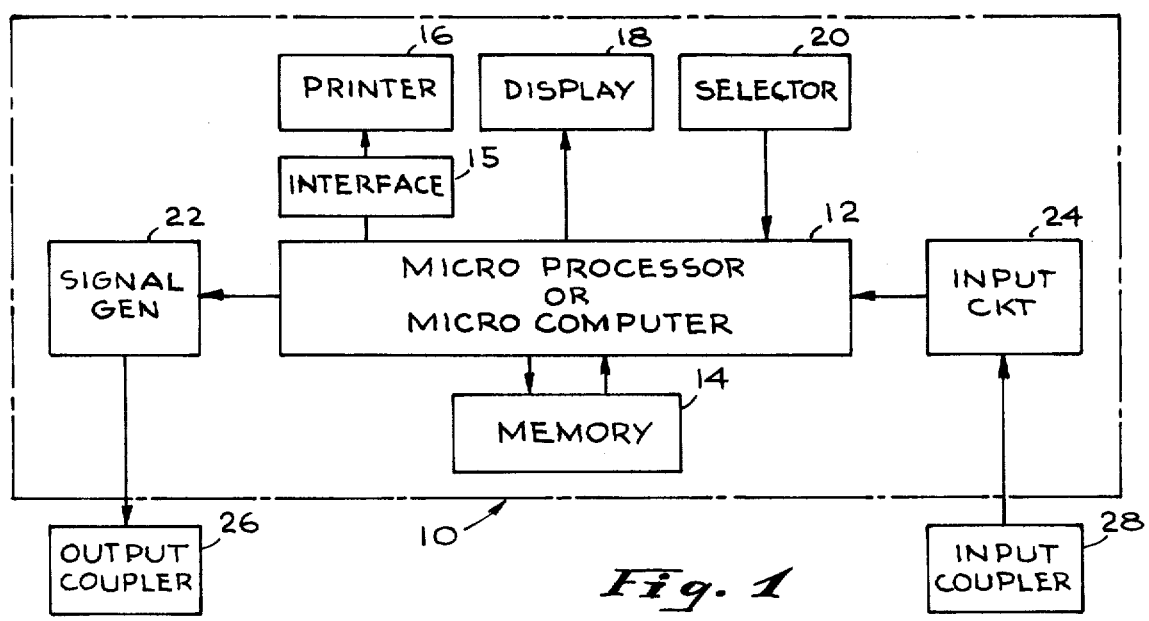
Fig. 1
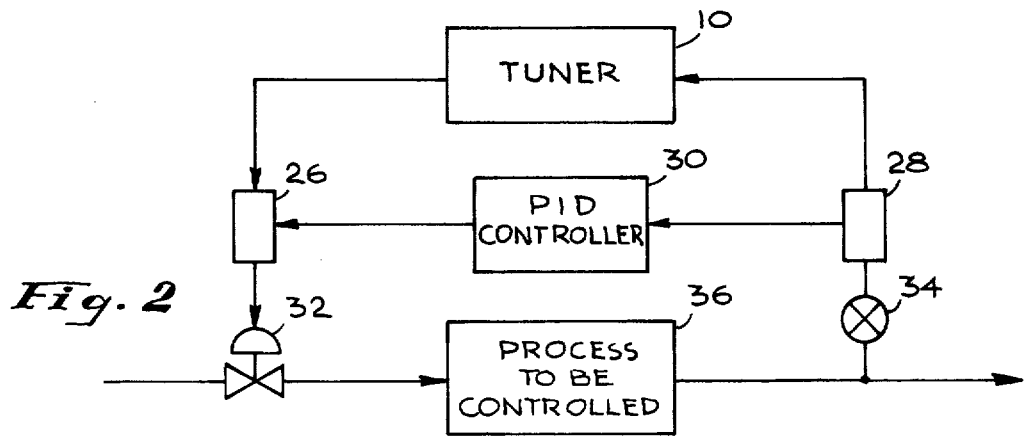
Fig. 2
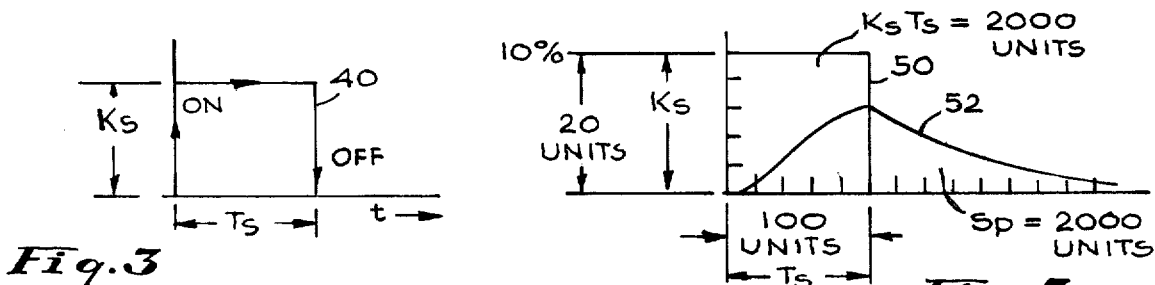
Fig. 3
Fig. 5
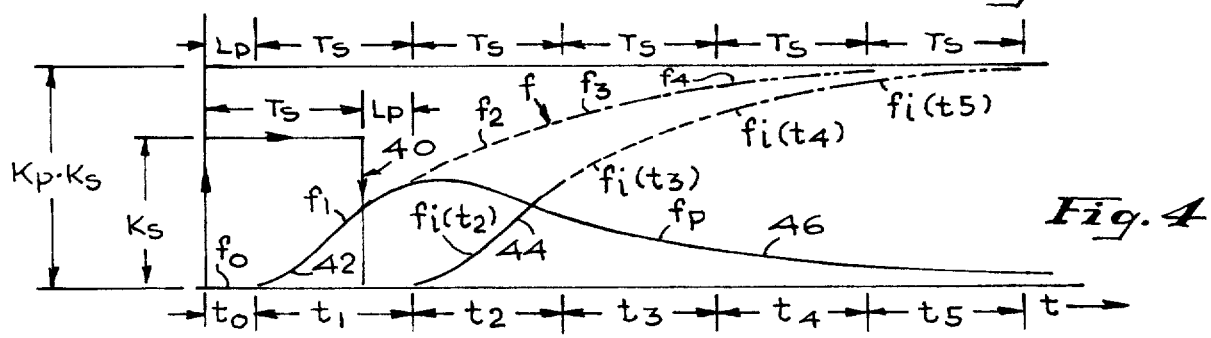
Fig. 4

APPARATUS FOR TUNING PID CONTROLLERS IN PROCESS CONTROL SYSTEMS

RELATED CO-PENDING APPLICATION

This application is a continuation of my previous application Ser. No. 6/198,185 filed Oct. 17, 1980, abandoned, that application being a continuation-in-part of my earlier application Ser. No. 115,197 filed Jan. 25, 1980 abandoned.

BACKGROUND OF THE INVENTION

1. Field of the Invention

This invention relates to tuners for proportional-integral-derivative (PID) controllers in process control systems.

2. Prior Art

The literature is replete with techniques and discussions of how to tune the controller in a process control system to optimize process performance. One of the classic discussions on this subject is an article by Ziegler and Nichols in the transaction of the American Society of Mechanical Engineers Vol. 64, Nov. 1942, at P. 759. Fundamentally, these systems rely on applying a step function to the system and measuring the change at the output from the system as a function of time. The curve thus derived consists of a dead time plus a simple, or compound exponential curve. If multiple capacitances exist in the system (as is generally the case) an "S" shaped curve is obtained, with an initial dead time representing the inertia of the system. It has been customary to derive a time constant (representing the transfer function of the plant or process) by drawing a line tangent to the response curve at its point of inflection and determining the slope (R) of that line and its point of intersection with the time axis. The length of time (L) between the commencement of the response curve and the intersection of the tangent line with the time axis could also be easily determined. It was called the "lag" of the system by Ziegler and Nichols and they taught that the best setting for the proportional action factor ($K_1$) could be obtained when:

$$K_1 = P/RL$$

where P is the process change to be corrected.

Derivative and integral action settings can also be found from the process reaction curve using the slope of the tangent to the point of inflection. However, this method is not accurate for several reasons. First, the point of inflection may be indistinct and the slope of the tangent line may, therefore, be inaccurately determined. The result is an erroneous controller setting. Fundamentally, the resolution and accuracy of the prior art systems were low and subject to various human factors which further reduced their accuracy.

In addition, the application of a step function to a process results in a long-term disturbance of the process which makes the use of the step function approach unattractive to the production personnel of the factory incorporating the process.

SUMMARY OF THE INVENTION

It is a first object of this invention to overcome the general disadvantages of the prior art systems, as set forth hereinbefore.

It is a further object of this invention to provide an accurate, high resolution tuner and method for a process controller.

Stated succinctly, a rectangular pulse (rather than a step function) is applied to a process controlling element in a system. The pulse may be uni-polar or bi-polar in composition.

The area under the response curve for the system when such a pulse is applied is determined. Optimally, the trailing edge (or falling portion) of the pulse occurs at the time constant of the system i.e. when the response amplitude equals 0.632 = Pulse Amplitude (with a system gain of 1).

Once the area under the curve is known the transfer function of the process can be determined and expressed in Laplace transform notation. If desired, the step function response of the system may be synthesized and displayed. PID tuning values may then be calculated utilizing one or more of the desired tuning systems (e.g. Ziegler-Nichols). Simulated process response may be displayed for each tuning system to be utilized.

BRIEF DESCRIPTION OF THE DRAWINGS

My invention can best be understood by referring to the discussion which follows taken in conjuction with the accompanying drawings, in which:

FIG. 1 is a block diagram of the essential functional elements in a tuner for a PID controller, according to my invention;

FIG. 2 is a block diagram of a controlled process utilizing my tuner invention;

FIG. 3 is a time diagram showing the pulse function to be applied to a process system, utilizing the teachings of my invention;

FIG. 4 shows the response curve for a system to which the pulse of FIG. 3 has been applied and the components of that response curve;

FIG. 5 shows the area relationship between the initial pulse and the area under the process' response curve;

DETAILED DESCRIPTION OF THE PREFERRED EMBODIMENT

Figure 6:
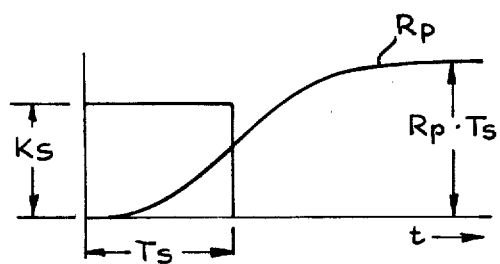
FIG. 6 shows the response curve of a non-self-balancing process system subjected to a pulse input.

In FIG. 1, tuner 10 includes a microprocessor or microcomputer 12 which may be a dedicated microprocessor or the microprocessor portion of a microcomputer, such as the IMSAI VDP-40 manufactured by IMSAI Manufacturing Corporation, 14860 Wicks Blvd., San Leandro, CA 94577. The IMSAI microcomputer also includes memory 14, display 18 and a keyboard for inputting instructions. I/O ports are provided for coupling to such peripherals as printer 16 (through interface 15), selector 20 (which permits the operator to choose a tuning program) and input circuit 24 which may perform isolating and amplifying functions. One of the output ports of microprocessor 12 is coupled to signal generator 22 which generates a variable-width square-wave pulse controlled by the microprocessor. The microprocessor itself may be a type Z-80 available from MOSTEK Corporation, 1215 W. Crosby Road, Carrollton, Tex. 75006. Peripherals adapted to that chip are also available from MOSTEK Corporation. That corporation also sells a single chip microcomputer designated MK3870 which could be used with this invention. The details of that microcomputer are set forth in their bulletin No. 79540 published February, 1978.

In FIG. 2 tuner 10 is shown coupled to output coupler 26 and input coupler 28 without disconnecting those couplers from controller 30. This is an important convenience because the existing system is left intact when the tuner according to my invention is applied to the controller. When my tuner is in use controller 30 is put in a manual state. Controller 30 may be any one of a variety of PID controllers available or in use today such as the Evershed Electronic Process Controller, Mark 4. Control drive 32 may be an electrical valve positioner such as that available from Philips Gloelampenfabriken of Eindhoven, Holland. Sensor 34 is a condition sensor such as a thermocouple which provides an electrical voltage output proportional to a local condition, such as temperature. Such sensors are of a wide variety and widely available and need not be discussed further here.

In FIG. 3 the pulse 40 from signal generator 22 in FIG. 1 is shown. It has an amplitude $K_s$ and a duration $T_s$. $T_s$ is variable under the control of microporcessor 30, the objective being to set $T_s$ at a value equal to the time constant $T_p$ of the process 36 (FIG. 1) to be controlled. Pulse 40 may be electrical, thermal, pneumatic, mechanical or hydraulic in nature, its nature being determined by the type of process 36 being controlled.

In FIG. 4, the application of pulse 40 of amplitude $K_s$ to process 36 having a gain $K_p$ produces a response curve 42 or $f_p$ made up of dead time $t_o$ (also sometimes referred to as $L_p$) a rising exponential curve $f_l$ produced by the leading edge of pulse 40 and a falling compound curve 46 made up of the difference between the instantaneous values of the rising curve f and a falling exponential curve (the inverse of which is shown in FIG. 4 as curve 44) produced by the trailing or falling edge of pulse 40, following another dead time $L_p$.

The following relationships prevail in the curves of FIG. 4, by reason of the fact that curves 42 and 44 are of the same shape being only time-displaced by the time $T_s$:

$$f_p = f - f_i \quad \text{(Eq. 1)}$$

| t | f |
|---|---|
| $t_0 = 0 \rightarrow L_p$ (dead time) | $f_0 = f(t_0) = 0$ |
| $t_1 = L_p \rightarrow L_p + T_s$ (pulse duration) | $f_1 = f(t_1) = f_p(t_1)$ (Eq. 2) |
| $t_2 = L_p + T_s \rightarrow L_p + 2T_s$ | $f_2 = f(t_2) = f_p(t_2) + f_1[= f_x(t_2)]$ |
| $t_3 = L_p + 2T_s \rightarrow L_p + 3T_s$ | $f_3 = f(t_3) = f_p(t_3) + f_2[= f_x(t_3)]$ |
| $t_4 = L_p + 3T_s \rightarrow L_p + 4T_s$ | $f_4 = f(t_4) = f_p(t_4) + f_3[= f_x(t_4)]$ |

The applied pulse 40 overrides the normal output of the controller to control drive 32. Further, pulse 40 is not applied until process 36 is in a stable or quiescent state. For the analysis included herein the system or process is considered to be a linear, time-invariant system.

Another important relationship is represented by the graphs of FIG. 5. In FIG. 5 a square pulse of amplitude $K_s$ and duration $T_s$ is applied to the system under test. $K_s$, in this case, is one-tenth of the maximum amplitude of the output signal applied to output coupler 26. The precision or resolution of the control system output through control drive 32 is presumed to be ±0.5% (1/200) of its full range. For a 1/10th full range pulse a resolution of 20 steps may be achieved. Thus, pulse 50 in FIG. 5 may be divided into 20 amplitude steps or slices.

Along the time axis in FIG. 5 it is possible to get very high resolution by simply using a high sampling rate. In FIG. 5, the pulse width $T_s$ has been divided into 100 equal time increments.

The area of pulse 50 is, therefore, $K_x \times T_s = 2,000$ units. It can be shown empirically and mathematically that the area $S_p$ under response curve 52 in FIG. 5 is also 2000 units. Thus the area of the pulse equals the area under the response curve. Expressed mathematically, $S_p = K_p K_s T_s$, (Eq.3) where $K_p$ is the gain in the system or process. This area resolution and relationship makes it possible to achieve, by the method of this invention, a much more accurate determination of the process or system time constant, transfer function and tuning coefficients for optimum system performance and minimum settling time following a disturbance in the process.

As was indicated in connection with FIG. 4, there is, following the introduction of pulse 40 into the process, a dead time $L_p$ resulting from process or system inertia. When the time axis is being sampled by microprocessor 12 for the purpose of determining the time duration of response curve 52 prior to calculating the area thereunder, it is necessary to eliminate the dead time $L_p$. This elimination is achieved by sampling the amplitude values of the initiating pulse and the response curve. This process, which may be referred to as time-transition averaging, utilizes the leading and trailing edges of pulse 40 as references and detects the related amplitude transitions in the response curve 46 (FIG. 4). The time difference between the initiating and response transitions is calculated in tuner 10 to give the dead time $L_p$. Such dead time is then eliminated by microprocessor 12 from the calculation of the areas under response curve 46 (FIG. 4).

The timing of the trailing edge of pulse 40 (i.e. the time when pulse 40 is shut off) is important. Theoretically, the optimum time for shutting off pulse 40 is when the response curve, for example curve 42 in FIG. 4, has reached a level equal to 0.632 × its maximum amplitude. That time is the first ordered time constant of the system. Stated mathematically, the equation for the amplitude response to the system following the application of the rising or leading edge of pulse 40 is:

$$Y_t = K_p K_s \left(1 - e^{\frac{t}{T_p}}\right) \qquad \text{(Eq. 4)}$$

where $Y_t$ is the amplitude of the response at any time "t" (after any dead time); $K_p$ is the system gain; $K_s$ is the signal amplitude and $T_p$ is the time constant of the system.

When $t = T_p$ the value of $Y_t$ becomes $0.632 \times K_p K_s$. With $K_s$ defined as having the value 1(one) and $K_p$ equal to or greater than 1, tuner 10 will give a solution for $T_p$ and related coefficients for chosen tuning processes. If $K_p$ is less than 1 (one) the tuner 10 cannot give a solution and, by reason of microprocessor 12 and its programming, the operator will receive instructions on display 18 and printer 16 advising of the failure and recommending re-trying with $K_s$ at double the previous value.

The discussion thus far has dealt with processes or systems which are closed-loop or self-balancing systems. Open loop or non-self-balancing systems give a different response (See FIG. 6) and require a different analysis.

The transfer function $G_p(s)$ for such an open loop system is:

$$G_p(s) = \frac{R_p e^{-L_p s}}{s(T_p s + 1)} \qquad \text{(Eq. 5)}$$

where $L_p$ is the dead time and $T_p$ is the time constant of the process and s is the Laplace transform operator.

Figure 7:
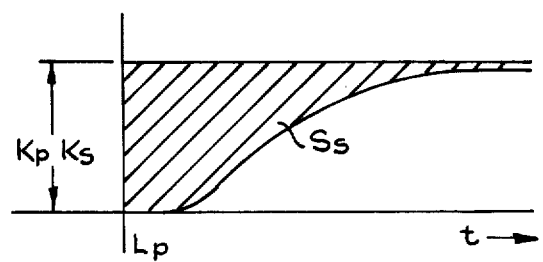
FIG. 7 is a graphical showing of certain area relationships between input and response signals.

The tuner 10, in determining the step-response characteristics of an open-loop process or system, relies upon the relationships set forth in Equation 1 and 2, supra, to synthesize the step signal response from the pulse signal response. Then, it can be shown, the area $S_s$ in FIG. 7 can be expressed by the equation:

$$S_s = K_p \cdot K_s (L_p + T_{p1} + T_{p2}) \qquad \text{(Eq. 6)}$$

where, the transfer function $G_p(s)$ of the process can be expressed as follows:

$$G_p(s) = \frac{K_p e^{-L_p s}}{(T_{p1} s + 1)(T_{p2} s + 1)} \qquad \text{(Eq. 7)}$$

where s indicates the Laplace transform operator, $T_{p1}$ and $T_{p2}$ are time constants in the process, $L_p$ is the dead time of the system and $K_p$ and $K_s$ are process gain and input signal level, respectively.

By solving Eq. 3 for $K_p$ we get $$K_p = S_p / K_s T_s \qquad \text{(Eq. 8)}$$

Substituting Eq. 8 in Eq. 6 we derive the following relationship:

$$L_p + T_{p1} + T_{p2} = (S_s / S_p) \times T_s \qquad \text{(Eq. 9)}$$

These calculations are done within microprocessor 12 which hsa been appropriately programmed in advance.

Figure 8:
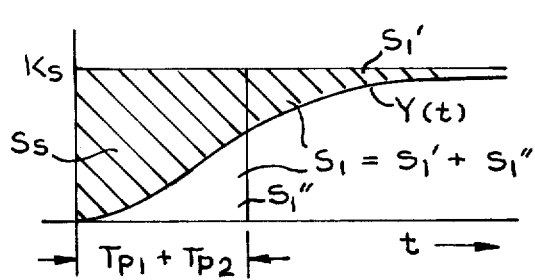
FIG. 8 shows the area under the response curve of FIG. 7 exclusive of that associated with dead time.

Dead time $L_p$ is then eliminated by using the time-transition averages technique described hereinbefore. The result is the curve of FIG. 8. To separate $T_{p2}$ from $T_{p1}$ another area $S_1$ is introduced (FIG. 8).

By non-dimensionizing $T_{p1}$ and $T_{p2}$ after dividing them by $S_s = T_{p1} + T_{p2}$ and defining new time constants $$T'_{p1} = \frac{T_{p1}}{T_{p1} + T_{p2}} \text{ and } T'_{p2} = \frac{T_{p2}}{T_{p1} + T_{p2}} \qquad \text{(Eq. 10)}$$

then: $T'_{p1}$ is determined from the following equation:

$$\frac{S_1}{S_s} = \frac{e^{-1}}{2T'_{p1} - 1}\left(T'_{p1}{}^2 \cdot e^{-\frac{1}{T'_{p1}} + 1} - (1 - T'_{p1})^2 e^{-\frac{T'_{p1}}{1 - T'_{p1}}}\right) \qquad \text{(Eq. 11)}$$

Having $T'_{p1}$ we find $T_{p2}$ from the equation:

$$T'_{p2} = 1 - T'_{p1} \qquad \text{(Eq. 12)}$$

It is important to note that, while a non-self balancing or open-loop process represented by the transfer function of Equation 5, has no equilibrium point for the step input used by the prior art, it does have an equilibrium point for the pulse input taught by my invention. Further even in an open-loop process or system my area approach to determining the transfer function of the process applies. In FIG. 8 the cross-hatched area $S_s$ over the curve Y(t) is equal to the area under the rectangle $K_s(T_{p1} + T_{p2})$ at $t = T_{p1} + T_{p2}$. This also means that the area $S_1'$ equals the area $S_1''$. These relationships make it possible to determine the time constants $T_{p1}$ and $T_{p2}$, as well as $T_p$, the time constant of the process and the parameter we are ultimately seeking.

Figure 9:
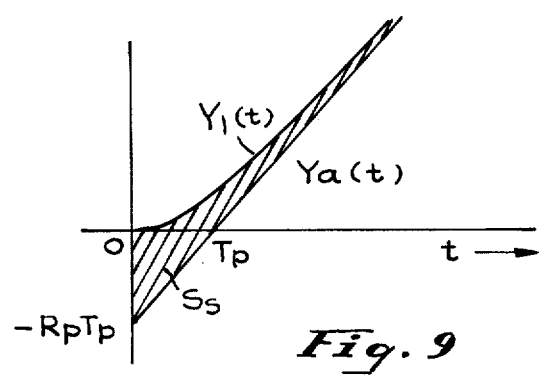
FIG. 9 shows, graphically, useful area for the calculation of the characteristics of a first non-self-balancing process control system.

For the area $S_s$ in FIG. 9 the following relationship holds:

$$S_s = R_p \times T_p^2 \qquad \text{(Eq. 13)}$$

Figure 10:
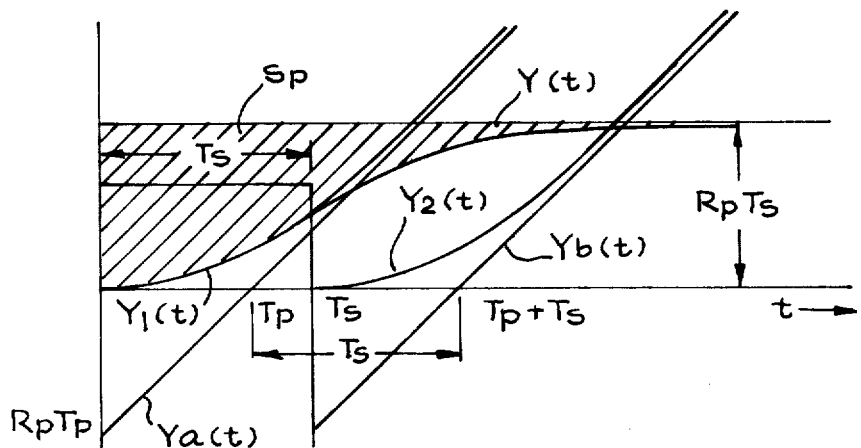
FIG. 10 is a diagram showing useful area for calculation of the characteristics of a second non-self-balancing system.

For the area $S_p$ in FIG. 10 the following relationship holds:

$$S_p = R_p T_s \left(T_p + \frac{T_s}{2}\right) \qquad \text{(Eq. 14)}$$

$T_p$ is derived from the following equation:

$$T_p = \frac{S_s \times T_s}{2 S_p}\left(1 + \sqrt{1 + \frac{2 S_p}{S_s}}\right)^2 \qquad \text{(Eq. 16)}$$

The tuner, according to my invention, may now be used to tune the process according to one of four selectable tuning systems, recited, supra. All of these except the critical sensitivity tuning system of Ziegler-Nichols have predetermined recommended parameters which can be set in on tuner 10 after the tuning system is selected.

In the critical sensitivity tuning system the gain (or sensitivity) of the process is increased until oscillations occur and the gain and oscillation frequency are measured. These permit setting of PID parameters for optimum process performance. Such process oscillation presents practical disadvantages for it results in severe process interruption. In my invention the values of $K_u$ (critical sensitivity) and $P_u$ (oscillation period) are automatically derived with minimal disturbance to the process utilizing the pulse-area approach already described to derive the time constants $T_{p1}$ and $T_{p2}$ of the process and the critical sensitivity, $K_u$, and oscillation period, $P_u$, are derived from the equations:

$$\pi = 2\pi \frac{L_p}{P_u} + \tan^{-1}\left(2\pi \frac{T_{p1}}{P_u}\right) + \tan^{-1}\left(2\pi \frac{T_{p2}}{P_u}\right) \quad \text{(Eq. 17)}$$

$$K_p K_u = \sqrt{1 + \left(2\pi \frac{T_{p1}}{P_u}\right)^2} \times \sqrt{1 + \left(2\pi \frac{T_{p2}}{P_u}\right)^2} \quad \text{(Eq. 18)}$$

After calculating $K_u$ and $P_u$ each tuning parameter is determined from the following relationships:

|         | $K_c$     | $T_i$     | $T_d$      |
|---------|-----------|-----------|------------|
| Pmode   | 0.50$K_u$ | —         | —          |
| PImode  | 0.45$K_u$ | 0.83$P_u$ | —          |
| PIDmode | 0.60$K_u$ | 0.50$P_u$ | 0.125$P_u$ |

Figure 11:
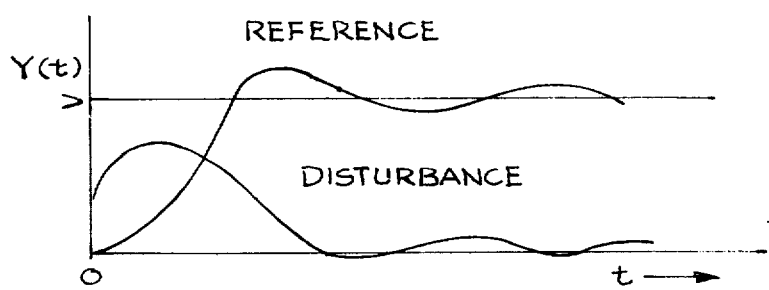
FIG. 11 is a graphical representation of the relationship of disturbance and reference signals in a system utilizing my tuner invention.

Application of these tuning parameters produces the curves of FIG. 11 for disturbance and test or reference inputs, respectively. Time compression or expansion can be accomplished in FIG. 11 by adjusting the rate of amplitude sampling by the microprocessor 12 in tuner 10.

The parameters derived may be used in a manually or automatically tuned controller.

Figure 12:
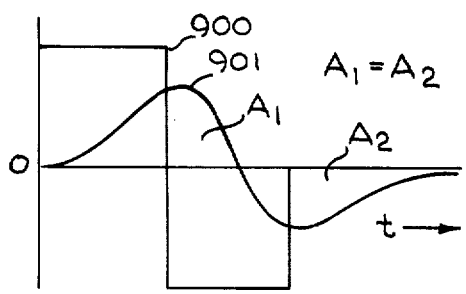
FIG. 12 is a graphical representation of a response curve when a bi-polar pulse is applied to a self-regulating process.

In FIGS. 6 thru 10 it is apparent that for a non-self-regulating process the single-pole rectangular pulse of FIG. 3 does not produce a closing response curve. As a result, certain inaccuracies in area calculation, and, hence, in calculated process parameters, occurs. Such inaccuracies can be eliminated by the use of the bi-polar "shuttle" pulse, 900, of FIGS. 12 and 13. FIG. 12 shows the response curve 901 of a self-regulating or self-balancing process to a shuttle pulse.

Figure 13:
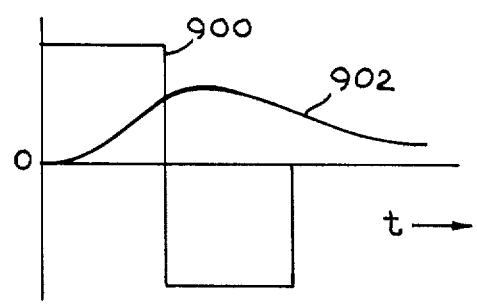
FIG. 13 is a graphical representation of a response curve when a bi-polar pulse is applied to a non-self-regulating process.

FIG. 13 shows the response of a non-self-regulating process to a bi-polar "shuttle" pulse. As can be seen from FIG. 13, response curve 902 tends to close towards the zero amplitude line (abscissa) even in a non-self-regulating process. Accuracy of process-parameter calculation is enhanced because the area under the curve is more accurately determinable. The apparatus and method of this invention, utilizing the shuttle pulse, can automatically discriminate between self-regulating and non-self-regulating processes.

Figure 14:
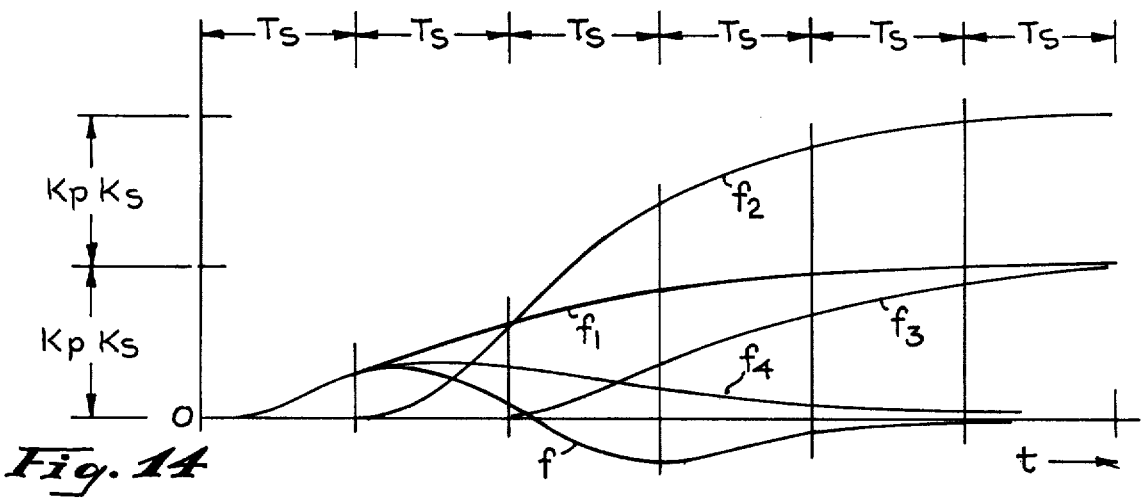
FIG. 14 is a graphical analysis of a response curve for a process stimulated by a bi-polar pulse.

Referring to FIG. 14, the following relationships exist between the curves shown, which result where a shuttle pulse is applied to a process.

| | |
|---|---|
| $0 \leq t \leq Ts$ | $f = f_1, f_4 = f_1$ |
| $Ts \leq t \leq 2Ts$ | $f = f_1 - f_2 = f_1(t) - 2 \times f_1(t - Ts)$ |
| | $f_4 = f - f_2/2 = f_1(t) - f_1(t - Ts)$ |
| $2Ts \leq t < \infty$ | $f = f_1 - f_2 + f_3 = f_1(t) -$ |
| | $2 \times f_1(t - Ts) + f_1(t - 2Ts)$ |
| | $f_4 = f - f_2/2 = f_1(t) - f_1(t - Ts)$ |

Figure 15:
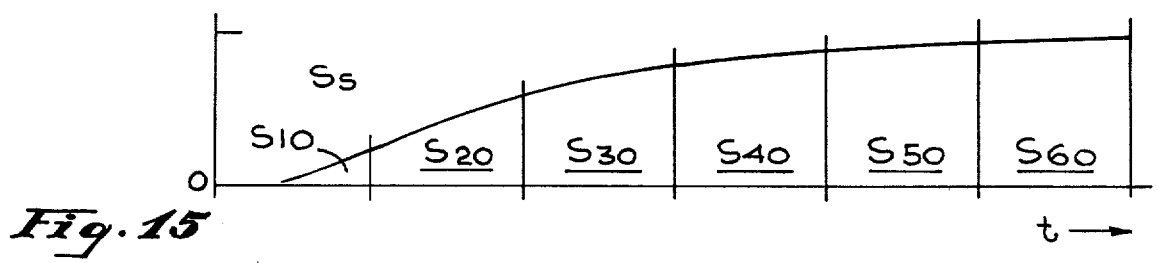
FIG. 15 is a graphical presentation of an area analysis for a process response curve.
Figure 16:
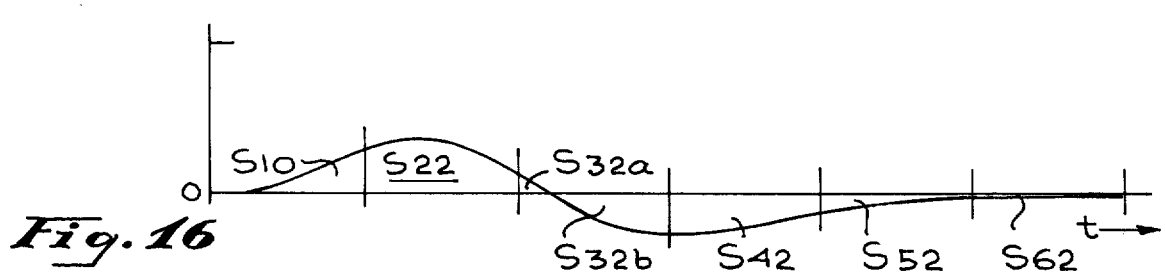
FIG. 16 is a graphical presentation of an area analysis of the response curve for a self-regulating process; and, FIG. 17 is a graphical presentation of an area analysis of the response curve for a non-self-regulating process to which a shuttle pulse has been applied.
Figure 17:
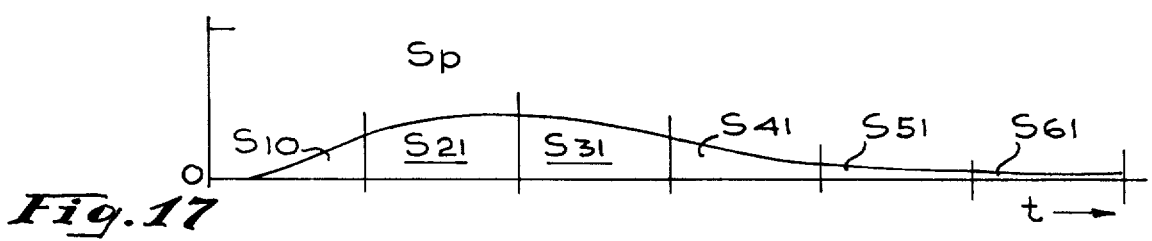

The goal of the identification is to determine the specific area, Ss in FIG. 15 and Sp in FIG. 17. The following equations apply:

$S20 = S22 + 2S10$ $S30 = S32 + 2S20 - S10 = S32a - S32b + 2S20 - S10$ $S40 = -S42 + 2SO30 - S20$ $S50 = S52 + 2S40 - S30$ $S60 = -S62 + 2S50 - S40$ $\phantom{S60} = S10 + S22 + S32a - S32b - S42 - S52 - S62 + - S50$ $S21 = S20 - S10$ $S31 = S30 - S20$ $S41 = S40 - S30$ $S51 = S50 - S40$ $S61 = S60 - S50$ $Sp = S10 + S10 + S21 + S31 + S41 + S51 + S61 = S60 \quad (1)$ $Ss = 6 \cdot Kp \cdot Ks \cdot Ts - S10 - S20 - S30 - S40 - S50 - S60 \quad (2)$ Another relationship is:

$S10 + S22 + S32a = S32b + S42 + S52 + S62 \quad (3)$

The total area on the right hand side of equation (3) can be first determined. When the total area below the time axis, (the right side of equation (3)) is almost equal to the total area above the axis, (left side of Eq. (3)) it gives an answer. For example, Sp = S60 in Equ. (1). Knowing Sp, we simply calculate Kp, since Sp = Kp·Ts. After Kp is determined, Ss is calculable by using equation (2). Thus, the transfer characteristics of either a self-regulatory or a non-self-regulatory process can be determined accurately utilizing a shuttle or bi-polar pulse.

While particular embodiments of my invention have been shown and described it is apparent to those skilled in the art that modifications or variations may be made without departing from the spirit or scope of my invention. It is the purpose of the appended claims to cover all such modifications or variations.

What is claimed is:

1. Apparatus for intermittent use in a control loop having a sensor and a driver and having a process value of a first magnitude to determine the optimum setting for a controller in such control loop;

said apparatus having an input terminal for connection to said sensor when the transfer function of said control loop is to be determined and an output terminal for connection to said driver during determination of the transfer function of said control loop;

said apparatus including a bi-polar-pulse generator coupled to said output terminal;

a manually operated switch electrically coupled to said bi-polar-pulse generator, said bi-polar-pulse generator being responsive to each actuation of said manually operated switch to produce at said output terminal a pulse combination comprising a single set of a positive and a negative-going rectangular pulse each having a magnitude which is small with respect to said first magnitude;

timing means;

said bi-polar-pulse generator being coupled to said timing means;

time-and-amplitude-sampling-and-storage means coupled to said input terminal of said apparatus and to said timing means to sample and store, as a function of time, the loop-response voltage appearing at said input terminal of said apparatus as a result of the application of said pulse combination to said driver from said apparatus, whereby a loop response curve corresponding to said pulse combination is effectively derived and stored;

first calculating means coupled to said time-and-signal-amplitude-sampling-and-storing means and to said timing means and responsive to signals from said timing means to calculate the area between said process response curve and a reference voltage level and to produce an electrical signal representative of such area; and, further calculating means coupled to said first calculating means and responsive to the area-representative electrical signal therefrom to calculate the transfer function of said process.

2. Apparatus according to claim 1 which includes, in addition, computer means coupled to said further calculating means for computing at least one controller parameter from said process transfer function.

3. Apparatus according to claim 1 in which said pulse combination has a magnitude not greater than 10% of said first magnitude.

4. Apparatus according to claim 1 in which said positive and negative going pulses are of equal magnitude.

5. Apparatus according to claim 1 in which the width of each of said pulses in said pulse combination approximates the time constant of said loop.

* * * * *